United States Patent [19]
Woundy

[11] Patent Number: 6,009,103
[45] Date of Patent: Dec. 28, 1999

[54] METHOD AND SYSTEM FOR AUTOMATIC ALLOCATION OF RESOURCES IN A NETWORK

[75] Inventor: Richard Woundy, Reading, Mass.

[73] Assignees: MediaOne Group, Inc., Englewood; U S West, Inc., Denver, both of Colo.

[21] Appl. No.: 08/997,279

[22] Filed: Dec. 23, 1997

[51] Int. Cl.[6] .................................................. H04L 12/00
[52] U.S. Cl. .......................................... 370/401; 709/226
[58] Field of Search .................................... 370/389, 400, 370/401–410, 431, 462, 463, 468, 420; 709/225, 226, 250

[56] References Cited

U.S. PATENT DOCUMENTS

| | | | |
|---|---|---|---|
| 5,790,548 | 8/1998 | Sistanizadeh et al. | 370/401 |
| 5,812,552 | 9/1998 | Arora et al. | 370/401 |
| 5,812,819 | 9/1998 | Rodwin et al. | 395/500 |
| 5,835,723 | 11/1998 | Andrews et al. | 370/252 |
| 5,854,901 | 12/1998 | Cole et al. | 395/200.75 |
| 5,862,345 | 1/1999 | Okanoue et al. | 395/200.68 |
| 5,872,523 | 2/1999 | Dellaverson et al. | 340/825.52 |
| 5,875,306 | 2/1999 | Bereiter | 709/220 |

*Primary Examiner*—Min Jung
*Attorney, Agent, or Firm*—Brooks & Kushman, P C

[57] ABSTRACT

In a broadband cable data network, a method and system for automatically allocating network resources such as IP addresses to control access to the network utilizes at least one DHCP server, and a common network database formed from a LDAP directory for storing respective user configuration parameters, hardware address registration, and current binding information. A DHCP server can add new hardware address registrations to the LDAP using an "unregistered" service class. The DHCP server sends a DHCP reply tailored for unregistered devices, such as by allocating a privately-allocated IP address with no Internet access, or an IP address for a self-provisioning web server. A DHCP server views IP address allocation as indefinite, while a user will view an IP address allocation as having a short duration. Thus, if the IP network configuration does not change, the user terminal will continue to receive the same allocated IP address due to the DHCP server's perception of an indefinite lease. The consistency of the IP addresses simplifies many operational concerns about dynamic addresses, such as minimizing DNS (domain name service) hostname updates, mapping IP addresses to user terminals during security incidents, etc.

12 Claims, 5 Drawing Sheets

METHOD AND SYSTEM FOR AUTOMATIC ALLOCATION OF RESOURCES IN A NETWORK

TECHNICAL FIELD

The present invention generally relates to systems for providing internetwork data distribution, such as the Internet, over a broadband cable data network, and more particularly to an improved arrangement for resource allocation by a dynamic host configuration protocol (DHCP) server in such a data distribution system.

BACKGROUND ART

Generally, network resources such as Internet protocol (IP) addresses are allocated by DHCP servers using one of three methods: (1) "automatic allocation"; (2) "dynamic allocation"; and (3) "manual allocation". In automatic allocation, a DHCP server assigns a permanent IP address to a user or subscriber terminal. In dynamic allocation, a DHCP server assigns an IP address to a user terminal for a limited period of time, or until the user explicitly relinquishes the address. In manual allocation, an IP address is assigned to a user terminal by a network administrator, and a DHCP server is merely used to convey the assigned address to the user. Conventional networks can use one or more of these methods, as determined by the policies of the network administrator.

However, none of these three methods of allocating IP addresses has proven fully satisfactory because of an inability to both ensure automatic, uninterrupted operation of a DHCP server while also maximizing flexibility in DHCP operation and service. In addition, a major function of a DHCP server is to balance the use of limited network resources so that all users will have an opportunity to gain access to the network. The above described IP allocation methods are inherently inefficient in providing such balancing of network use. For example, automatic allocation is inefficient because allocation of IP addresses is not based on actual use or need. Manual allocation is inefficient with respect to management of the network (manual allocation) because of the requisite human interaction. Finally, dynamic allocation is too conservative in IP allocation to truly support an "always-on" type network service, i.e., a network where users do not have to continually log-on and off to gain access to the desired network services.

DISCLOSURE OF THE INVENTION

It is therefore an object of the present invention is to provide a resource allocation which overcomes the above-noted deficiencies of known allocation methods.

It is another object of the present invention to provide a method of resource allocation in an internetwork type cable distribution system which ensures uninterrupted, correct operation of a DHCP server while also maximizing DHCP server flexibility.

It is yet another object of the present invention is to provide a DHCP server which can support multiple synchronized DHCP servers in order to remove single points of failure.

It is still a further object of the present invention to provide a DHCP server which can support a flexible IP network configuration, such as multiple IP subnets on the same physical Ethernet, and allows graceful reconfiguration of the IP network such as splitting a physical Ethernet into multiple LANs.

It is still another object of the present invention is to provide a DHCP server which maximizes potential user service differentiation by sending specific configuration parameters to user premise equipment such as Pcs, Macs, LANcity cable modems, in support of a plurality of different service tiers.

To maximize DHCP server flexibility, the DHCP server of the present invention uses standard network protocols where possible, notwithstanding that a standard DHCP server synchronization protocol has not been adapted by the industry. In particular, an LDAP (Lightweight Directory Access Protocol) directory operates as a DHCP server database, thereby permitting tight integration of subscriber personal information with subscriber device information.

In accordance with the present invention, a DHCP server views IP address allocation as indefinite, while a user terminal/premise equipment will view an IP address allocation as having a short duration, e.g., one day or less. Thus, if the IP network configuration does not change, the user terminal will continue to receive the same allocated IP address due to the DHCP server's perception of an indefinite lease. The consistency of the IP addresses simplifies many operational concerns about dynamic addresses, such as minimizing DNS (domain name service) hostname updates, mapping IP addresses to user terminals during security incidents, etc.

In addition, if the IP network configuration does change, the user terminal will renew and/or rebind quickly, due to the user's perception of a short allocation duration. This flexibility with respect to IP network changes (due to short allocation reservation times) assists a graceful network reconfiguration. As part of the reconfiguration process, a "snapshot" of IP address mappings can be made just prior to reconfiguration so as to support imminent security incidents. The reconfiguration will be complete upon expiration of the maximum allocated address reservation time.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
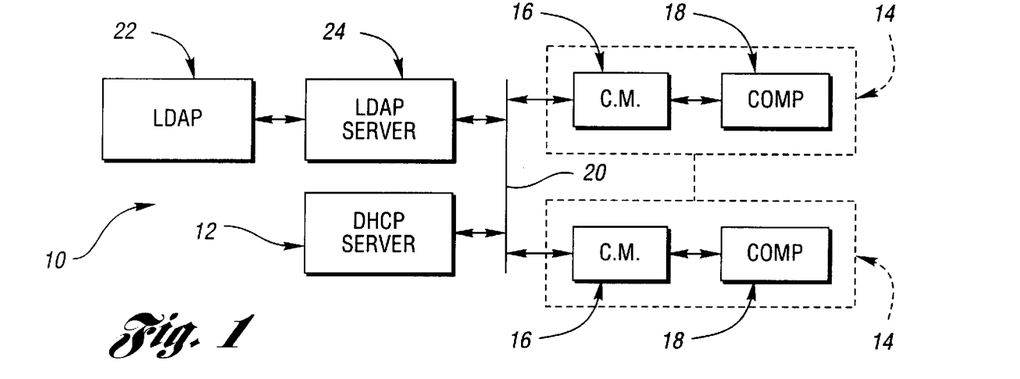
FIG. 1 is a block diagram of a broadband cable data distribution system in accordance with the present invention.

Referring to FIG. 1, a broadband cable data distribution system 10 in accordance with the present invention is shown having at least one DHCP server 12 functioning to automatically allocate and assign network resources/IP addresses to a plurality of user terminals 14 having a computer 16 connected to server via a cable modem 18 and a coaxial cable 20. User terminals could also be connected via an Ethernet type connection.

A lightweight directory access protocol (LDAP) directory 22 is connected to the DHCP server and functions as a common network user information and access privilege database. An LDAP directory server 24 manages access to the LDAP directory.

In general, a DHCP server in accordance with the present invention is arranged to support both user terminal Ethernet interfaces such as Pcs, Macs, workstations, etc., and user terminal cable modems such as LANcity in particular. The DHCP server is also preferably arranged to support other potential DHCP users, such as RAS dial-in ports with 16-byte hardware addresses.

The DHCP server is provided with suitable programming to facilitate transmission of different DHCP parameters and option values to users based on a configured classification of the user device. For example, a LANcity subscriber premise modem may belong to a "basic", "high-bandwidth," or "disconnected" class. A LANcity head-end modem could belong to a "head-end" class. A user terminal Ethernet interface may belong to a "standard", "NetBIOS-enabled", "unregistered", or "disconnected" class.

Future service classes may require user configuration of current DHCP options, e.g., NetBIOS servers and parameters, and future DHCP options such as default web servers. The DHCP server is further arranged to anticipate uncertainty by permitting configuration of DHCP options on a type-length-value basis.

In further accordance with the present invention, the DHCP server anticipates that multiple IP subnets may co-exist on the same Ethernet, and uses a service class designation of the user terminal to determine which IP subnet is valid. In particular, the DHCP server allows assignment of IP addresses to user terminal Ethernet interfaces, and the assignment of privately-allocated IP address (from a 10.0.0.0 network) to LANcity cable modems. The DHCP server also allows assignment of different pools of addresses to user terminal Ethernet interfaces, such as in situations when an IP address conveys special privileges like IP access control lists in routers.

The DHCP server further anticipates the renumbering of IP networks, and the deliberate partitioning of Ethernet networks into multiple LANs. The DHCP server can use a relay agent or BOOTP relay agent IP address as a key to the source Ethernet network, but the server will not assume a user IP subnet based solely on the relay agent address.

While any DHCP server in the system may send a DHCP reply based on a previously allocated IP address, only a single server will be authorized to allocate a new IP address per IP subnet. This considerably reduces the possibility of assigning the same IP address to multiple users. Thus, only a single point of failure exists during provisioning of new users, and during reconfiguring the network.

In further accordance with the present invention, all DHCP servers obtain respective configuration parameters, hardware address registration, and current binding information from a common network directory. This arrangement significantly simplifies the restart of a crashed DHCP server, and replacement of an entire DHCP server host.

To that end, DHCP servers are arranged to support common configuration parameters, a common binding directory, and common knowledge of the IP address allocation responsibilities for the system. The servers are also provided with asynchronous updates of this information, which is performed under control of a system manager located externally to the common network directory.

In further accordance with the present invention, an authorized DHCP server can add new hardware address registrations to the common network directory using an "unregistered" service class. If the "unregistered" service class is not defined for a particular source Ethernet, then the DHCP server will not send a DHCP reply. If the "unregistered" service class is defined, then the DHCP server sends a DHCP reply tailored for unregistered devices, such as by allocating a privately-allocated IP address with no Internet access, or an IP address for a self-provisioning web server. An "unregistered" service class may be used for technician laptop Pcs, for current subscribers who have changed Ethernet boards, and for potential subscribers for Internet over cable service demonstrations.

The use of an unregistered service class thus operates as a temporary assignment of an IP address assignment. However, there are certain situations where it may be undesirable to grant user terminals a temporary IP address, such as for unregistered LANcity cable modems, and RAS dial-in ports on subscriber Windows NT servers. The DHCP server should allow the configuration of arbitrary hardware address prefixes, and a default service class for devices matching the prefix (if an exact hardware address match is not found). To disable unregistered LANcity cable modems and RAS dial-in ports, their unique prefixes would be map to a "disconnected" service class.

Using an "unregistered" service class, a user terminal will allow the user to access a web server, which then allows user authentication and subsequent device registration of the user as a new terminal. The DHCP server directory is then updated with the device registration information. Thus, users can change an Ethernet interface with minimal operator intervention. Such an arrangement facilitates user self-provisioning, i.e., registration.

The network directory is preferably implemented as a lightweight directory access protocol (LDAP) directory which is pooled among all DHCP servers via a LDAP server. The use of an LDAP directory for the DHCP servers provides DHCP server synchronization and tight integration between user personal information such as name, street address, e-mail address, and other contact information, and user terminal information such as hardware address, IP address, and logical location information.

The LDAP directory is updated before a DHCP server sends a response with a new permanent IP address allocation. Distributed DHCP update replicators are used to send asynchronous updates as is generally well understood in the art. If a DHCP server loses its connection to the update replicators, then the DHCP server re-synchronizes using the LDAP directory. If an update replicator loses a connection to a DHCP server, then the update replicator also re-synchronizes using the LDAP directory.

DHCP server data is organized into three primary data structures: (1) a hardware address binding table; (2) a subnet mapping table; and (3) a service description table. More specifically, the hardware address binding table maps a hardware address to associated class information and to its currently assigned IP address (if any). The service class name differentiates different types of devices, e.g., subscriber Ethernet interfaces versus cable modems, as well as different user service profiles such as a basic service versus a premium. In the preferred embodiment, the fields are defined as follows:

| | | |
|---|---|---|
| haddr | (key) | The hardware address (also encodes the hardware address type and length). |

| | | |
|---|---|---|
| class | | The name of the service class to which the device belongs. |
| ipaddr | | The IP address currently assigned to the hardware address (0.0.0.0 if none). |
| tmp-ipaddr | | The IP address temporarily allocated to the hardware address (0.0.0.0 if none). |
| hostname | | The hostname of the device (for DNS sync). |
| last-server | (opt) | The last DHCP server to have assigned the IP address (for DHCP server sync). |
| lease-time | (opt) | The expiration time of the most current lease (for dynamic alocation). |

In addition, a hardware address prefix table can be added, and can include "paddr"—the hardware address prefix including type and length, and "dclass"—the default service class for the prefix.

The subnet mapping table maps an IP subnet to the name of the physical Ethernet, and the DHCP server (if any) responsible for assigning new addresses for the IP subnet. The mapping is used to find the physical Ethernet of DHCP relays (with non-DHCP assigned addresses) as well as DHCP users (with DHCP assigned addresses). If multiple IP subnets co-exist on the same Ethernet, they map to the same physical Ethernet name. In the preferred embodiment, the fields are defined as follows:

| | | |
|---|---|---|
| subnet | (key) | The IP subnet value. |
| netmask | | The IP subnet netmask. |
| e-name | | The name of the physical Ethernet network. |
| server | | The DHCP server responsible for subnet address assignment (0.0.0.0 if none). |

The service description table maps a service class and physical Ethernet name to its IP address allocation range and DHCP option profile information. Each service description entry has a (possibly empty) reference to another service description entry, next-profile, with "more generic" information. The next-profile field allows the operator to build hierarchies of service descriptions. In the preferred embodiment, the fields are defined as follows:

| | | |
|---|---|---|
| class | (key) | The service class for one or more devices. |
| e-name | (key) | The name of the physical Ethernet network. |
| ip-range | | The beginning and end of the IP address allocation range. |
| profile | | Specific values for various DHCP fields and options. |
| next-profile | | Reference to a profile in a "more generic" service description table entry. |

Overall operation of the network resource/IP address allocation in accordance with the present invention will be described in connection with FIGS. 2–4.

Figure 2A:
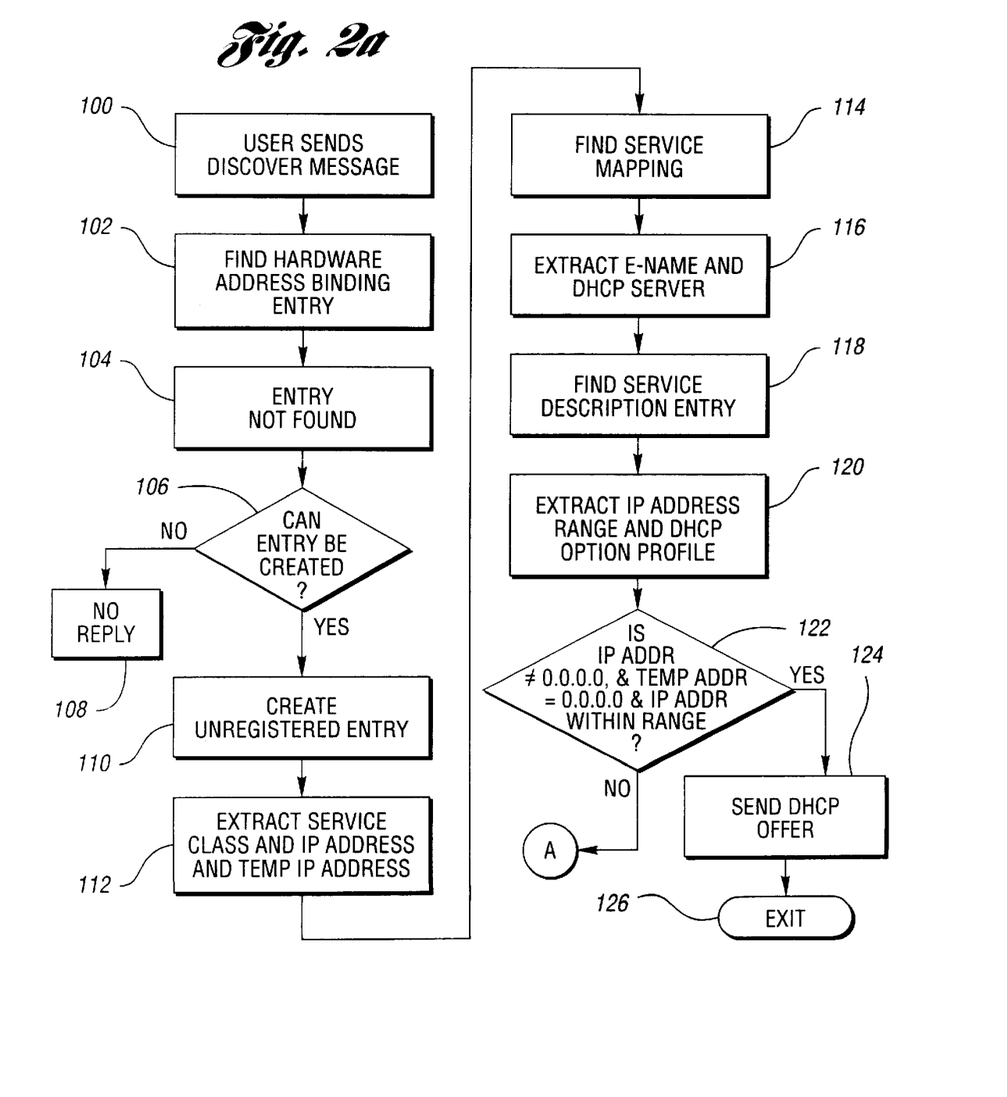
FIGS. 2a and 2b are a flowchart illustrating resource allocation control responsive to a Discover message in accordance with the present invention.
Figure 2B:
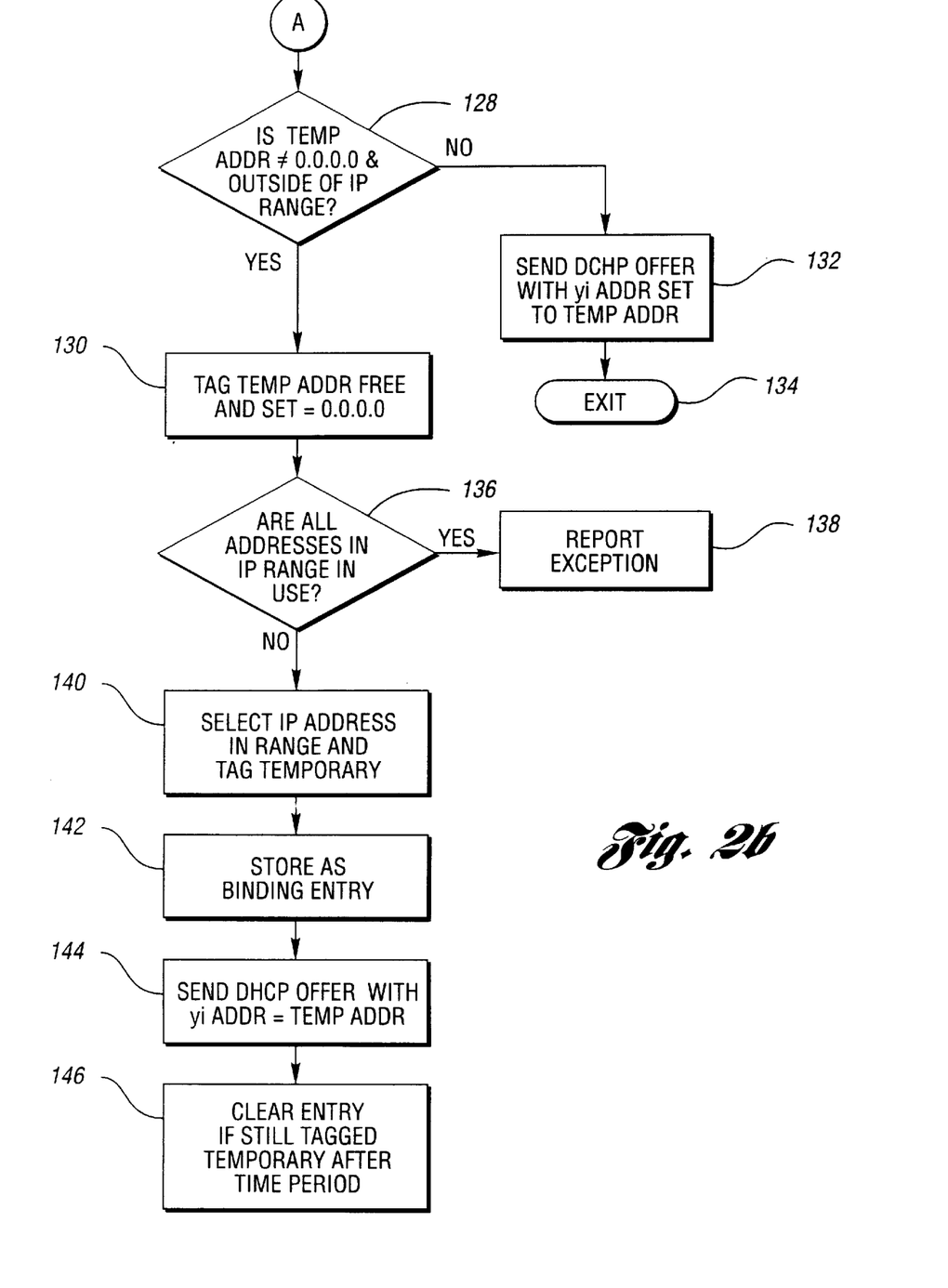

As shown in the flowchart of FIG. 2, when a user terminal wants to find a candidate DHCP server, the user terminal sends out a Discover message at block 100. The DHCP server is programmed to respond to a Discover message by using the hardware address type (htype), hardware address length (hlen), and user hardware address (chaddr) from the discover message to find the hardware address binding entry at block 102. As shown at block 104, if a matching hardware address binding entry does not exist, the server determines at block 106 whether an entry can be created. As noted above, in those situations where it is not desired to create a new entry, such as for RAS ports, the DHCP server will not reply to the Discover message at block 108. Otherwise, at block 110 a new entry is created with class="unregistered", e.g., ipaddr="0.0.0.0", and tmp-ipaddr="0.0.0.0".

Then at block 112 the service class (class) is extracted, and assigned an IP address (ipaddr), and temporary IP address (tmp-ipaddr) from the hardware address binding entry. If a relay agent address (giaddr) of the discover message is not "0.0.0.0," the giaddr is used to find the appropriate subnet mapping entry at block 114. Otherwise, the Ethernet interface address of the DHCP server is used to find the subnet mapping entry.

If a matching subnet mapping entry does not exist, the DHCP server exits without replying. Otherwise the Ethernet name (e-name) and responsible DHCP server (server) are extracted from the subnet mapping entry at block 116. The class from the hardware address binding entry and the e-name from the subnet mapping entry are used to find the service description entry at block 118.

If a matching service description entry does not exist, the DHCP exits the routine without replying. Otherwise, at block 120 the IP address allocation range (ip-range) and DHCP option profile information (profile and next-profile) are extracted from the service description entry. At blocks 122 and 124, if tmp-ipaddr is "0.0.0.0," ipaddr is not "0.0.0.0," and ipaddr is within the bounds of the ip-range, a DHCP Offer message is sent to the user terminal.

The Offer message allocates the reserved IP address as "your IP address" (yiaddr) and is set to ipaddr, while the DHCP server identifier option is set to the Ethernet interface address of the DHCP server, and the DHCP options for subnet mask and IP address lease time are derived from the profile/next-profile hierarchy. After sending the Offer message, the DHCP server exits the routine at block 126.

If the server of the subnet mapping entry is not equal to this DHCP server, the current DHCP will exit the routine without replying. At block 128, if tmp-ipaddr is not "0.0.0.0," and tmp-ipaddr is outside the bounds of the ip-range, then tmp-ipaddr is tagged as "free" at block 130 and set to "0.0.0.0." If tmp-ipaddr is not "0.0.0.0" and the tmp-ipaddr is not outside the bounds of the IP range, a DHCP Offer message is sent at block 132 with yiaddr set to tmp-ipaddr, the DHCP server identifier option set to the Ethernet interface address of the DHCP server, and the DHCP options for subnet mask and IP address lease time derived from the profile/next-profile hierarchy. Again, the DHCP server exits the routine at block 134 after sending the Offer message.

As shown at block 136, if all IP addresses of the ip-range are "in use," then an exception is reported at block 138 and the server exits without replying. Otherwise, a "free" IP address is selected in the ip-range with a preference for the requested IP address option of the discover message. The selected IP address is then tagged as "temporarily in use" at block 140, and stored in tmp-ipaddr in the hardware address binding entry at block 142. A DHCP Offer message is then sent at block 144 with yiaddr set to tmp-ipaddr, the DHCP server identifier option set to the Ethernet interface address of the DHCP server, and the DHCP options for subnet mask and IP address lease time derived from the profile/next-profile hierarchy. At block 146, after an appropriate timer expiration, if tmp-ipaddr IP address is still "temporarily in use," tmp-ipaddr is tagged as "free," and the tmp-ipaddr is cleared in the hardware address binding entry.

When a user sends a Request message to select a particular Offer, or to verify/extend an existing address reservation, a user may verify/extend a lease after a user reboot, a renewal time expiration, or a rebinding time expiration. The Request message will contain a DHCP server identifier option when selecting an Offer, and will not contain a server identifier when verifying/extending a lease.

Figure 3A:
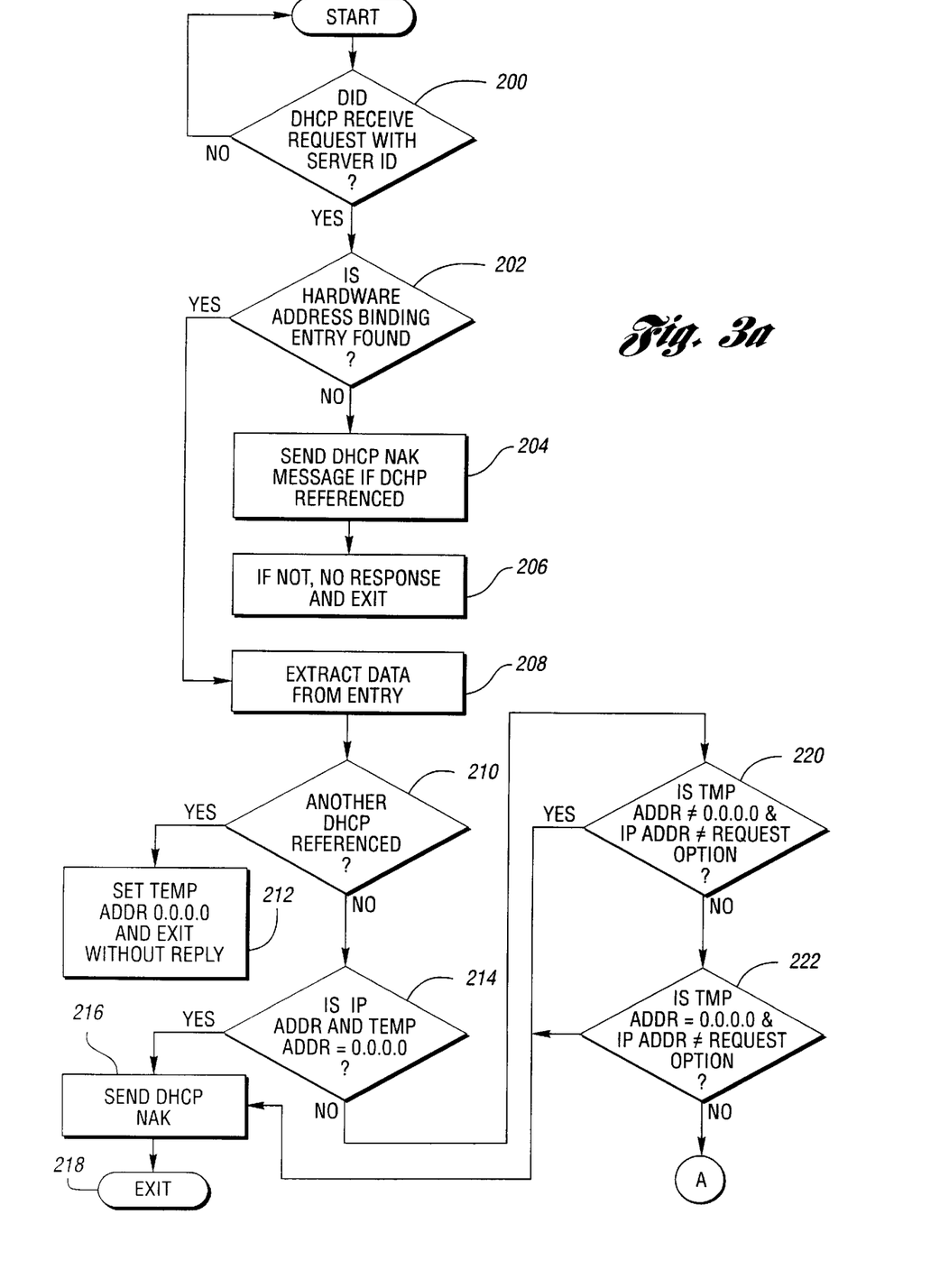
FIGS. 3a and 3b are a flowchart illustrating resource allocation control responsive to a Request message having a server identifier in accordance with the present invention.
Figure 3B:
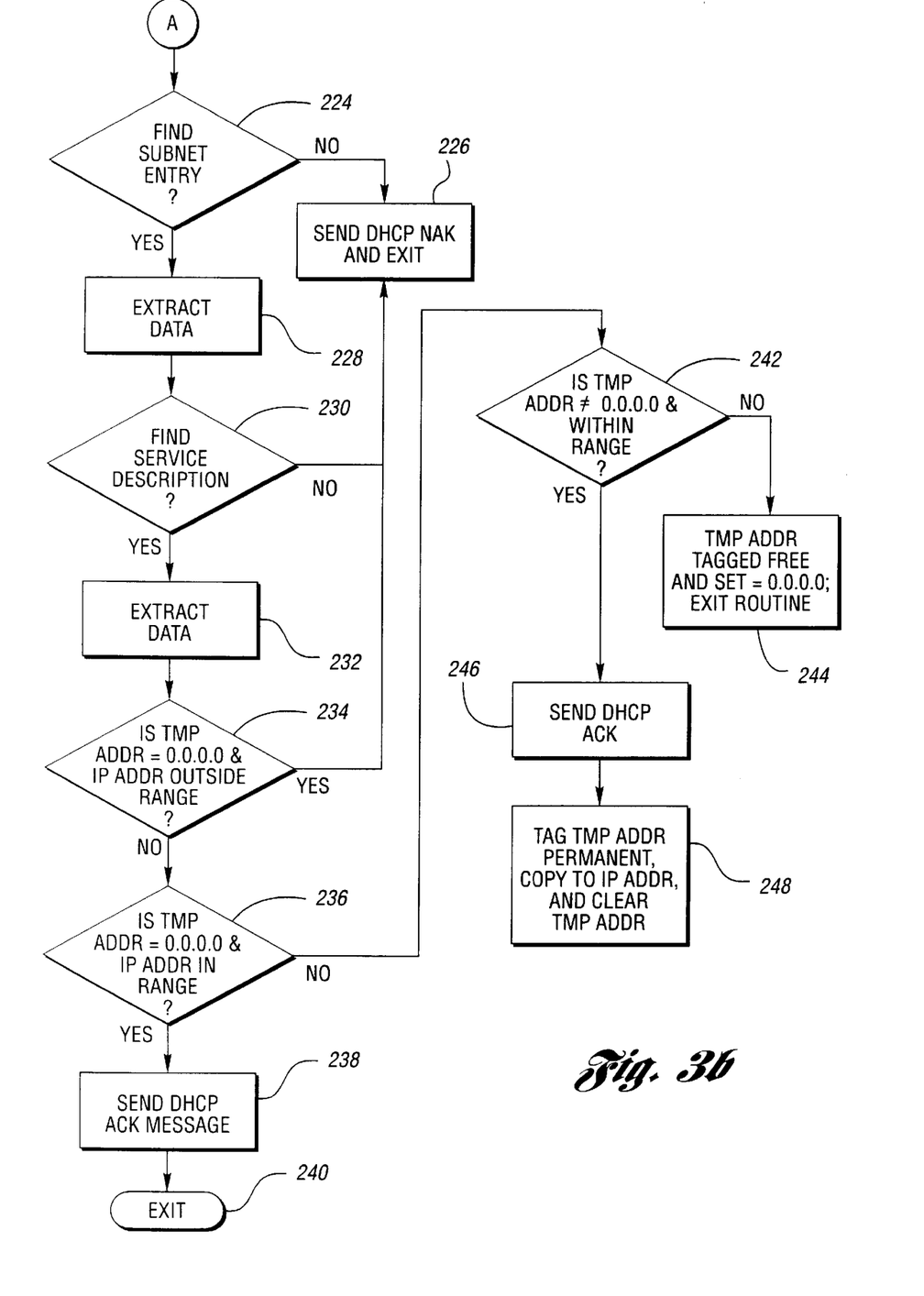

Referring now to the flowchart shown in FIG. 3, a DHCP server is programmed to respond to a Request message at block 200 having a server identifier which selects an Offer. More specifically, the hardware address type (htype), hardware address length (hlen), and user hardware address (chaddr) are used from the Request message to find the hardware address binding entry at block 202. If a matching hardware address binding entry does not exist, then a DHCP Nak message is sent at block 204 if the server identifier option of the Request message references this server. Otherwise the server will not reply and exits the routine at block 206.

The service class (class), assigned IP address (ipaddr), and temporary IP address (tmp-ipaddr) are then extracted from the hardware address binding entry at block 208. If the server identifier option of the Request message refers to another DHCP server, as shown at block 210 tmp-ipaddr is tagged as "free" and tmp-ipaddr is set to "0.0.0.0" (if not already "0.0.0.0"), and the server exits the routine without replying at block 212.

At block 214, if both ipaddr and tmp-ipaddr are "0.0.0.0," then a DHCP Nak message is sent at block 216 and the routine exited at block 218. If tmp-ipaddr is not "0.0.0.0," and ipaddr does not equal the requested IP address option of the Request message as shown at block 220, a DHCP Nak message is also sent and the routine exited. At block 222, if tmp-ipaddr is "0.0.0.0," and ipaddr does not equal the requested IP address option of the Request message, then a DHCP Nak message is sent and the routine exited.

If a relay agent address (giaddr) of the Request message is not "0.0.0.0," the giaddr is used to find the subnet mapping entry at block 224. Otherwise, the Ethernet interface address of the DHCP server is used to find the subnet mapping entry. If a matching subnet mapping entry does not exit, then a DHCP Nak message is sent and the routine exited at block 226. Otherwise, the Ethernet name (e-name) and responsible DHCP server (server) are extracted from the subnet mapping entry at block 228.

The class from the hardware address binding entry and the e-name from the subnet mapping entry are then used to find the service description entry at block 230. If a matching service description entry does not exist, then a DHCP Nak message is sent and the routine exited. Otherwise, the IP address allocation range (ip-range) and DHCP option profile information (profile and next-profile) are extracted from the service description entry at block 232.

At block 234, if tmp-ipaddr is "0.0.0.0," and ipaddr is outside the bounds of the ip-range, a DHCP Nak message is sent and the routine exited. At block 236, if tmp-ipaddr is "0.0.0.0" and ipaddr is within the bounds of the ip-range, then a DHCP Ack message is sent at block 238. The Ack message should have "your IP address" (yiaddr) set to ipaddr, the DHCP server identifier option set to the Ethernet interface address of the DHCP server, and the DHCP options for subnet mask and IP address reservation time derived from the profile/next-profile hierarchy. After sending the Ack message, the routine is exited at block 240.

If the server of the subnet mapping entry is not equal to the current DHCP server, then a DHCP Nak message is sent and the routine exited. At block 242, if tmp-ipaddr is not "0.0.0.0" and is outside the bounds of the ip-range, then at block 244 a DHCP Nak message is sent, tmp-ipaddr is tagged as "free," and tmp-ipaddr is set to "0.0.0.0," after which the routine is exited. Otherwise, a DHCP Ack message is sent at block 246 including "your IP address" (yiaddr) set to tmp-ipaddr, the DHCP server identifier option set to the Ethernet interface address of the DHCP server, and the DHCP options for subnet mask and IP address reservation time derived from the profile/next-profile hierarchy. Then, at block 248 tmp-ipaddr is tagged as "permanently in use," and tmp-ipaddr is copied to ipaddr and subsequently cleared.

Figure 4:
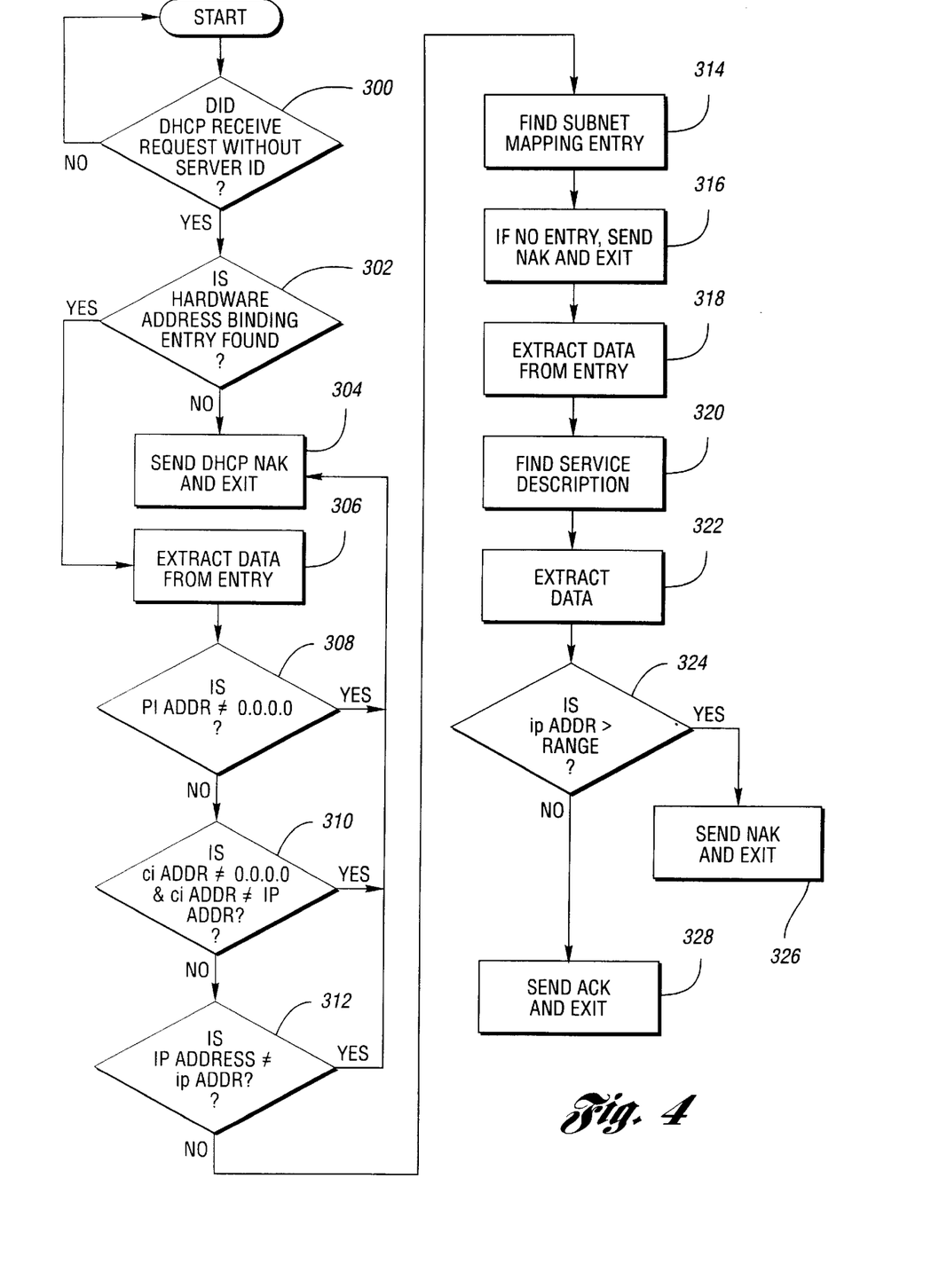
FIG. 4 is a flowchart illustrating resource allocation control responsive to a Request message without a server identifier in accordance with the present invention.

Referring now to the flowchart shown in FIG. 4, at block 300 the DHCP server is programmed to respond a Request message without a server identifier (verifying/extending a reservation) by using the hardware address type (htype), hardware address length (hlen), and user hardware address (chaddr) from the Request message to find the hardware address binding entry at block 302. If a matching hardware address binding entry does not exist, then a DHCP Nak message is sent and the routine exited. Otherwise, the service class (class) and assigned IP address (ipaddr) are extracted from the hardware address binding entry at block 306.

At block 308, if ipaddr is "0.0.0.0," then a DHCP Nak message is sent and the routine exited. If the user IP address (ciaddr) of the Request message is not "0.0.0.0," and ciaddr does not equal ipaddr, at block 310 a DHCP Nak message is sent and the routine exited. If the requested IP address option of the Request message does not equal ipaddr, at block 312 a DHCP Nak message is sent and the routine exited.

If a relay agent address (giaddr) of the Request message is not "0.0.0.0," giaddr is used to find the subnet mapping entry at block 314. Else, if the user IP address (ciaddr) of the Request message is not "0.0.0.0," then ciaddr is used to find the subnet mapping entry. Otherwise, the Ethernet interface address of the DHCP server is used to find the subnet mapping entry.

If a matching subnet mapping entry does not exist, at block 316 a DHCP Nak message is sent and the routine exited. Otherwise, the Ethernet name (e-name) and responsible DHCP server (server) is extracted from the subnet mapping entry at block 318. The class from the hardware address binding entry and the e-name from the subnet mapping entry are used to find the service description entry at block 320. If a matching service description entry does not exist, a DHCP Nak message is sent and the routine exited.

The IP address allocation range (ip-range) and DHCP option profile information (profile and next-profile) are extracted from the service description entry at block 322. If ipaddr is outside the bounds of the ip-range at block 324, a DHCP Nak message is sent and the routine exited at block 326. Otherwise, at block 328, a DHCP Ack message is sent. The Ack message should have "your IP address" (yiaddr) set to ipaddr, the DHCP server identifier option set to the Ethernet interface address of the DHCP server, and the DHCP options for subnet mask and IP address reservation time derived from the profile/next-profile hierarchy.

In addition to the Discover and Request messages, a user can send a Decline message to notify the DHCP server that the user has a duplicate IP address. The DHCP server will report an exception if a Decline message is received. Further, a user can also send a Release message to terminate an IP address reservation prematurely. With automatic allocation, no response from the DHCP server is necessary. Also, a user with a manually-assigned IP address can send an Inform message to get other configuration parameters from a DHCP server. A DHCP server response is similar to the response to a Request message without a server identifier, with the exception of the IP address assignment-related processing.

While the best mode for carrying out the invention has been described in detail, those familiar with the art to which this invention relates will recognize various alternative designs and embodiments for practicing the invention as defined by the following claims.

What is claimed is:

1. In a broadband cable data network where information is distributed from at least one DHCP server to a plurality of user terminals, a method for automatically allocating network resources to control access to the network comprising:

generating a discover message from a user wanting to receive allocation of a network resource;

at a DHCP server, detecting user identification information from the discover message to determine whether an address entry is currently stored for the user;

creating an unregistered class entry and assigning a temporary IP address to the user which allows only limited access rights to the network if an address entry does not exist; and sending an offer message which communicates the temporary IP address to allow limited access to a network user registration service.

2. The method of claim 1 wherein said IP address is tagged temporarily in use.

3. The method of claim 1 wherein the IP address is temporarily assigned, and is stored as an address entry.

4. The method of claim 1 further comprising a user selecting an DHCP offer by sending a request message identifying the offering server.

5. The method of claim 4 further comprising determining whether an address entry is currently stored based on identification information received in the request message, and sending an acknowledgment message if an address entry exists indicating a temporary address has been assigned.

6. The method of claim 5 further comprising registering the user by changing the assigned IP address from a temporary, limited access IP address to a permanently in use IP address having a predetermined duration of valid use.

7. The method of claim 1 further comprising a user selecting an DHCP offer by sending a request message not identifying a server.

8. The method of claim 4 further comprising determining whether an address entry is currently stored based on identification information received in the request message, and sending an acknowledgment message if an address entry exists indicating a temporary address has been assigned.

9. The method of claim 1 further comprising determining at the user a duplicate assigned IP address, and sending a decline message to the DHCP server indicating nonacceptance of the offer.

10. The method of claim 1 further comprising sending a release message from the user to cause premature termination of the IP address assignment.

11. The method of claim 1 wherein assignment of the temporary address is automatically reset after a predetermined period of time.

12. The method of claim 1 further comprising determining a user type based on the identification information, and creating an unregistered class entry and assigning a temporary IP address only if the user type is one of an acceptable type of user device.

* * * * *